(12) United States Patent
Park et al.

(10) Patent No.: US 7,283,716 B2
(45) Date of Patent: Oct. 16, 2007

(54) STRAIN TUNABLE, FLEXIBLE PHOTONIC CRYSTALS

(75) Inventors: Wounjhang Park, Superior, CO (US); Jeong-Bong Lee, Plano, TX (US); Mark T. Tinker, Plano, TX (US); Ethan F. Schonbrun, Boulder, CO (US)

(73) Assignees: The Regents of the University of Colorado, Denver, CO (US); The Board of Regents of the University of Texas System, Richardson, TX (US)

( * ) Notice: Subject to any disclaimer, the term of this patent is extended or adjusted under 35 U.S.C. 154(b) by 0 days.

(21) Appl. No.: 10/969,148

(22) Filed: Oct. 20, 2004

(65) Prior Publication Data

US 2005/0117866 A1 Jun. 2, 2005

Related U.S. Application Data

(60) Provisional application No. 60/513,073, filed on Oct. 21, 2003.

(51) Int. Cl.
*G02B 6/10* (2006.01)
(52) U.S. Cl. ..................................... 385/129
(58) Field of Classification Search ................. 385/129
See application file for complete search history.

(56) References Cited

U.S. PATENT DOCUMENTS 6,093,246 A * 7/2000 Lin et al. ....................... 117/92
6,542,682 B2 * 4/2003 Cotteverte et al. ........... 385/125
6,643,439 B2 * 11/2003 Notomi et al. ............... 385/125
6,674,949 B2 * 1/2004 Allan et al. .................. 385/129
6,747,773 B2 * 6/2004 Theil et al. .................. 359/237
2003/0227415 A1 * 12/2003 Joannopoulos et al. ..... 343/754

(Continued)

FOREIGN PATENT DOCUMENTS

WO WO 02/10843 A2 2/2002

(Continued)

OTHER PUBLICATIONS

Kosaka et al, "Superprism phenomena in potonic crystals", Oct. 15, 1998, 1998 The American Physical Society, vol. 58, No. 16, Rapid Communications, Physical Review B, PRB 58.*

(Continued)

*Primary Examiner*—Ellen E. Kim
(74) *Attorney, Agent, or Firm*—Townsend and Townsend and Crew LLP

(57) ABSTRACT

A device is described based on flexible photonic crystal, which is comprised of a periodic array of high index dielectric material embedded in a flexible polymer. Dynamic, real time tunability is achieved by the application of a variable force with a MEMS actuator or other means. The force induces changes in the crystal structure of the photonic crystal, and consequently modifies the photonic band structure. The concept was demonstrated by a theoretical investigation on the effect of mechanical stress on the anomalous refraction behavior of the flexible PC, and a very wide tunability in beam propagation direction was observed. Experimental studies on fabrication and characterizations of the flexible photonic crystal structures were also carried out. High quality flexible PC structures were fabricated by e-beam lithography and anisotropic etching processes.

24 Claims, 9 Drawing Sheets

U.S. PATENT DOCUMENTS

2004/0076362 A1    4/2004    Wong
2004/0170352 A1    9/2004    Summers

FOREIGN PATENT DOCUMENTS

WO    WO 2004/008230 A2    1/2004
WO    WO 2004/008231 A1    1/2004

OTHER PUBLICATIONS

Notomi, "Theory of light propagation in strongly modulated phtonic crystals: Refractionlike behavior in the vicinity of the photonic band gap", Oct. 15, 2000, 2000 The American Physical Society, vol. 62, No. 16, Rapid Communications, Physical Review B, PRB 62.*

S. Kim and V. Gopalan, "Strain-tunable photonic band gap crystals," App. Phys. Lett. 78, 3015 (2001).

N. Malkova, S. Kim and V. Gopalan, "Strain-tunable light transmission through a 90° bend waveguide in a two-dimensional photonic crystal," App. Phys. Lett., 83, 1509 (2003).

C.W. Wong, P. Rakich, S. Johnson, M. Qi, H. Smith, E. Ippen, L. Kimerling, Y. Jeon, G. Barbastathis, S.-G. Kim, "Strain-tunable silicon photonic band gap microcavities in optical waveguides" App. Phys. Lett. 84, 1242 (2004).

S.-G. Kim, C. W. Wong, Y. B. Jeon, G. Barbastathis, "Strain-tuning of Periodic Optical Devices: Tunable Gratings and Photonic Crystals", Transducers '03, 202 (2003).

C. W. Wong, Y. B. Jeon, S.-G. Kim, "Strain-tuning of Optical Devices with Nanometer Resolution", Annals of CIRP 52, 431 (2003).

N. Malkova, "Tunable resonant light propagation through 90° bend waveguide based on strained photonic crystal," J. Phys.: Condens. Matter 16, 1523 (2004).

D. Scrymgeour, N. Malkova, S. Kim and V. Gopalan, "Electro-optic control of the superprism effect in photonic crystals," Appl. Phys. Lett. 82, 3176 (2003).

S.-Y. Lin, V. M. Hietala, L. Wang and E. D. Jones, "Highly dispersive photonic band-gap prism," Opt. Lett. 21, 1771 (1996).

W. Park and C. J. Summers, "Extraordinary Refraction and Dispersion in 2D Photonic Crystal Slabs", Opt. Lett. 27, 1397 (2002).

* cited by examiner (a)            (b)

STRAIN TUNABLE, FLEXIBLE PHOTONIC CRYSTALS

PRIORITY INFORMATION

This application claims priority from provisional application Ser. No. 60/513,073, filed Oct. 21, 2003.

STATEMENT REGARDING FEDERALLY SPONSORED RESEARCH OR DEVELOPMENT

The work of the inventors was supported in part by NSF grant ECS-0304442.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention generally relate to photonic crystals, and in particular the strain tuning of flexible photonic crystals

2. Description of the Related Art

Photonic crystals (PCs) are a class of materials that possess periodic dielectric constants. Such periodicity in dielectric constant strongly modulates the propagation of electromagnetic waves. There is a strong analogy between photonic crystals and real crystals. PCs exhibit photonic bands in a similar manner that electronic energy bands are formed in real crystals. Certain photonic crystals show photonic bandgaps, which are ranges of wavelengths in which generation and propagation of light is completely prohibited. Furthermore, the properties of PCs are likewise governed by the Bloch-Floquet theorem. Much like electronic dopants, defects may be introduced into PCs so that the periodicity in dielectric constants is perturbed locally. Such defects or impurities can act as active optical elements such as mirrors, waveguides and micro-cavities.

A photonic band gap provides a mechanism to confine light in a very small length scale. PC waveguides are typically created from semiconductor materials using e-beam lithography and standard semiconductor etching tools. To form a waveguide, a line defect is introduced to an otherwise periodic lattice, and light can be confined to the defect region and guided along the length of the waveguide. Those skilled in the art use well known analytical and numerical tools to design waveguides whose defect geometry is tailored towards certain wavelengths of light and different applications.

PCs can be used to build cavities with extremely high confinement factors in which strong enhancement of light-matter interaction occurs. Such high Q cavities exhibit strongly enhanced spontaneous emission rate and thus are ideal platforms to develop extremely low threshold lasers. Progress in nanofabrication techniques has made it possible to produce the complex PC structures required to build PC-based micro-cavities. The PC-based micro-cavity is typically defined by introducing a defect in an otherwise perfect PC structure. The defect acts as an optical cavity as it introduces a highly localized mode within the photonic bandgap.

PCs also exhibit extraordinary refraction and dispersion characteristics, orders of magnitude greater than in conventional optical materials. It has been shown that a beam entering the crystal with a small incident angle can experience strong positive or negative refraction with an extraordinarily large refraction angle. It should be noted that these properties are based on anisotropic and nonlinear dispersion and therefore do not require the existence of photonic bandgaps, significantly relieving material requirements. These novel properties present possibilities of achieving a new range of nanoscale optical devices that can focus, disperse, switch and steer light.

Recent developments have clearly demonstrated how PCs can generate, manipulate, process, transmit and detect light. There is significant promise in the possibility that PCs will be used extensively in compact and highly integrated nanoscale structures. These devices may provide the breakthroughs needed for the next-generation photonics technology. However, although many novel device schemes have been developed by extensive theoretical and experimental works, most of them are based on "passive" PC structures designed to perform certain functions without any means of external control.

A crucial innovation needed to fully exploit the unique optical properties of PCs is the ability to dynamically control or tune the photonic band structure and consequently their optical properties. There have been some efforts to achieve tunability by using electro-optic materials which change their refractive indices in response to an external electric field. Such research has predicted the tunability of photonic band structure by infiltrating liquid crystal (LC) into an opal structure. This work was soon followed by experimental demonstration of temperature tuning of photonic bandgap (PBG) in LC infiltrated PC structures. More recently, two-dimensional (2D) modeling studies showed tunability of the super-prism effect in 2D PCs infiltrated by LC and lead lanthanum zirconium titanate ($PbLaZrTiO_3$, PLZT). However, a more rigorous 3D simulation taking explicitly into account the finite thickness of the slab PC structure predicted that tunability is limited due to the small attainable changes in the refractive index of LC. There have also been recent efforts at strain tuning of PCs. While all of these developments are encouraging, it is clear that there exist certain fundamental limitations on achievable tunability. For LCs, the attainable change in refractive index is typically on the order of 15% and, for PLZT, it is typically smaller. To maximize their promise, there is a clear need for wider tunability in PCs.

Information relevant to attempts to address these problems can be found at

| U.S. Publication Numbers: | US 2004/0076362 |
| --- | --- |
|  | US 2004/0170352 |
| International Publication Number: | WO 02/10843 |
|  | WO 2004/008230 |
|  | WO 2004/008231 |

Additional Publications:

S. Kim and V. Gopalan, "Strain-tunable photonic band gap crystals," App. Phys. Lett. 78, 3015 (2001).

N. Malkova, S. Kim, and V. Gopalan, "Strain-tunable light transmission through a 90° bend waveguide in a two-dimensional photonic crystal," App. Phys. Lett., 83, 1509 (2003).

N. Malkova, V. Gopalan, "Strain-tunable optical valves at T-junction waveguides in photonic crystals," Phys. Rev. B, 68, 245115-1-6 (2003).

C. W. Wong, P. Rakich, S. Johnson, M. Qi, H. Smith, E. Ippen, L. Kimerling, Y. Jeon, G. Barbastathis, S.-G. Kim, "Strain-tunable silicon photonic band gap microcavities in optical waveguides" App. Phys. Lett. 84, 1242 (2004).

Y. B. Jeon, C. W. Wong, S. G. Kim, "Strain-Tuning of Nano-Optical Devices: Tunable Gratings and Photonic Crystals," 12th International Conference on Solid-State Sensors, Actuators and Microsystems. Digest of Technical Papers, 202 (2003).

S. Jun and Y. Cho, "Deformation-induced bandgap tuning of 2D silicon-based photonic crystals," Opt. Express 11, 2769 (2003).

S.-G. Kim, C. W. Wong, Y. B. Jeon, "Strain-tuning of Optical Devices with Nanometer Resolution", Annals of CIRP 52, 2003.

N. Malkova, "Tunable resonant light propagation through 90° bend waveguide based on strained photonic crystal," J. Phys.: Condens. Matter 16, 1523 (2004)

K. Busch and S. John, "Liquid-crystal photonic-band-gap materials: the tunable electromagnetic vacuum", Phys. Rev. Lett. 83, 967, (1999).

K. Yoshino, Y. Shinoda, Y. Kawagishi, K. Nakayama and M. Ozaki, "Temperature tuning of the stop band in transmission spectra of liquid-crystal infiltrated synthetic opal as tunable photonic crystal," Appl. Phys. Lett. 75, 932, (1999).

S. W. Leonard, J. P. Mondia, H. M. van Driel, O. Toader, S. John, K. Busch, A. Birmer, U. Gosele and V. Lehmann, "Tunable two-dimensional photonic crystals using liquid-crystal infiltration," Phys. Rev. B 61, R2389, (2000).

D. Scrymgeour, N. Malkova, S. Kim and V. Gopalan, "Electro-optic control of the superprism effect in photonic crystals," Appl. Phys. Lett. 82, 3176 (2003).

S. Xiong and H. Fukshima, "Analysis of light propagation in index-tunable photonic crystals," J. Appl. Phys. 94, 1286, (2003).

W. Park and C. J. Summers, "Optical Properties of Superlattice Photonic Crystal Waveguides", Appl. Phys. Lett. 84, 2013 (2004).

S.-Y. Lin, V. M. Hietala, L. Wang and E. D. Jones, "Highly dispersive photonic band-gap prism," Opt. Lett. 21, 1771 (1996).

H. Kosaka, T. Kawashima, A. Tomina, M. Notomi, T. Tamamura, T. Sato and S. Kawakami, "Superprism phenomena in photonic crystals", Phys. Rev. B 58, 10096 (1998).

W. Park and C. J. Summers, "Extraordinary Refraction and Dispersion in 2D Photonic Crystal Slabs", Opt. Lett. 27, 1397 (2002).

L. Wu, M. Mazilu and T. F. Krauss, "Beam Steering in Planar-Photonic Crystals: From Superprism to Supercollimator," J. Lightwave Technol. 21, 561 (2003).

S. G. Johnson and J. D. Joannopoulos, "Block-iterative frequency-domain methods for Maxwell's equations in a planewave basis," Opt. Express 8, 173 (2001).

However, each one of the cited references suffers from at least one of the following disadvantages: limited tunability, limited functionality, fabrication difficulties, or excessive cost or size.

For the foregoing reasons, there is a need for widely tunable PCs that can be fabricated on a very small scale using largely conventional lithography techniques.

SUMMARY

The present invention is directed to a device that satisfies the need for a widely tunable PC that can be fabricated using largely conventional lithography techniques. A device having features of the present invention comprises a flexible photonic crystal having a periodic array of dielectric material embedded in a flexible polymer. Such a device also includes means for applying a variable amount of force to the crystal to induce physical changes in its crystal structure.

According to one embodiment of the invention, the device comprises a flexible photonic crystal having an array of silicon pillars embedded in a flexible polymer, the polymer having a refractive index in the range of 1.4 to 1.6. In this device, at least one micro-electro-mechanical-system (MEMS) actuator apply a variable force to induce physical changes in the crystal structure of said photonic crystal.

According to different embodiments of the invention, a variety of devices are anticipated. At its most basic level, the application of force modifies the manner in which electromagnetic waves propagate in or on said photonic crystal. According to different embodiments, the force modifies the refractive index of the photonic crystal for the purpose of steering at least one beam of light. According to different embodiments, the force modifies the time for a beam of light to propagate through a waveguide in the flexible PC by changing the structure of the waveguide. According to different embodiments, the force modifies the lasing wavelength by changing the structure of a cavity mode of the flexible PC. According to different embodiments, the force modifies the structure of a cavity mode of the flexible PC to cause at least one selected wavelength of light to move from one waveguide to a second waveguide in the flexible PC. According to different embodiments, the force modifies the structure of a cavity mode of the flexible PC to filter at least one selected wavelength from a waveguide in the flexible PC.

BRIEF DESCRIPTION OF THE DRAWINGS

The drawings are informal drawings, made for purposes of examination. The drawings are readable, and can be effectively scanned and adequately reproduced for publication purposes. Embodiments of the present invention are illustrated by way of example, and not by way of limitation, in the figures of the accompanying drawings and in which like reference numerals refer to similar elements and in which.

DETAILED DESCRIPTION

Techniques, systems, devices and methods related to photonic crystals are described. Broadly stated, embodiments of the present invention address the application of a variable force on flexible photonic crystals in order to achieve tunability.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are discussed and utilized.

While, for convenience, embodiments of the present invention may be described with reference to tuning crystal structure and thereby modifying the refractive index of the flexible photonic crystal, the present invention is equally applicable to various other current and future applications. Such applications include a variety of tunable applications, including waveguides, add/drop multiplexers and filters, antennae, micro-cavity lasers, line-defect waveguide lasers, wavelength tuners, beam steering devices, and optical switches.

I. Strain Tunable, Flexible Photonic Crystal

This invention encompasses a fundamentally different approach to achieve tunability. The PC of the invention is flexible photonic crystal that is comprised of a periodic array of high index dielectric materials embedded in a flexible polymer film. According to the different embodiments of the invention, the flexible PC is subject to a variable force by an actuator or other means, thereby stretching and releasing the flexible polymer.

Figure 1:
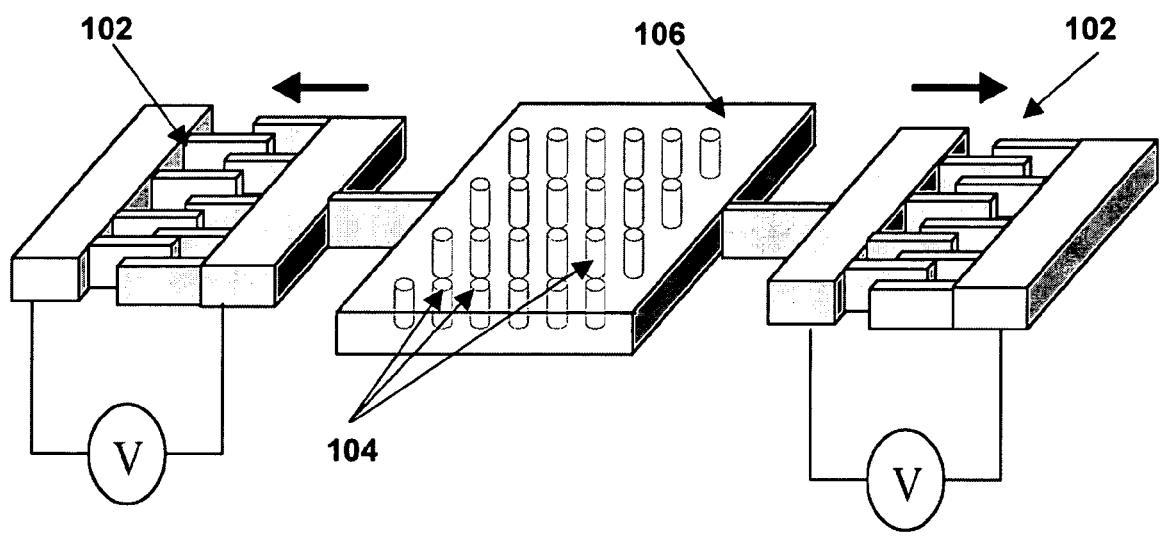
FIG. 1 shows a schematic diagram conceptually illustrating a flexible photonic crystal structure controlled by a pair of MEMS actuators, according to one embodiment of the invention.

One embodiment of the device concept is schematically shown in FIG. 1. The flexible photonic crystal structure is controlled by a pair of MEMS actuators 102. The flexible photonic crystal is composed of an array of high index dielectric material, silicon pillars 104 in this case, embedded in a flexible polymer film 106.

Regarding the dielectric material in the flexible PC, semiconducting materials are a good choice because of their higher indices of refraction. III-V compounds are a strong option within that group because of their high refractive index and wide use and production familiarity. Silicon and germanium are other wise choices for similar reasons. According to one embodiment, in order to achieve sufficient contrast with the flexible polymer, the dielectric material shall have a refractive index over 3.

Flexible polymers often have refractive indices around 1.5. No specific index of refraction is required, as the issue of primary concern is the contrast between the refractive index of the dielectric material and that of the flexible polymer. The index contrast must be merely high enough for the flexible PC (1) to form photonic bands in the range required with regard to the wavelengths and material at issue, or (2) to otherwise modify incoming electromagnetic waves. Although most application will utilize photonic bandgaps, they are not always required. For example, the giant refraction phenomenon is based on anisotropic and nonlinear dispersion and therefore does not require the existence of photonic bandgaps, significantly relieving material requirements. Whether or not a photonic bandgap exists, the contrast necessary will obviously vary depending on the application for which the embodiment of the invention is being used. The minimum index contrast ratio is often around 1.5, although a ratio of 2 is far more typical. In addition, the flexible polymer must be a low loss polymer for obvious reasons. In light of the foregoing, a good choice for the polymer is poly-dimethylsiloxane (PDMS) or polyimide.

According to different embodiments of the invention, the array of dielectric material may be in a periodic or semi-periodic configuration, including triangular, square, rectangular, and honeycomb lattice. The dielectric material may be used to form a one-, two-, or three-dimensional PCs. Two-dimensional structures can be fabricated by conventional lithography techniques, and have broader applications than one-dimensional structures. Thus, the focus of the modeling and fabrication thus far has been on 2D flexible PCs. The dielectric material may be in any shape, including a dot, pillar, or sphere, on the condition that it is significantly uniform in each period through some portion of the photonic crystal. Due to limitations in fabrication technology, slight deviations in periodicity and other aspects of the PC are to be expected, and must be taken into account in design According to one embodiment of the invention, silicon pillars are embedded in a flexible polymer film of poly-dimethylsiloxane (PDMS) or polyimide to form the flexible PC. The flexible PC exhibits a high index contrast, leading to the formation of photonic bands or otherwise possessing novel refractive characteristics.

According to the different embodiments of the invention, the flexible PC is subject to a variable force by an actuator or other means, thereby stretching and releasing the flexible polymer. The application of such force results in physical changes in crystal structure to which the photonic bands are extremely sensitive. This approach can therefore produce excellent tunability.

According to different embodiments of the invention, the actuator is a micro-electro-mechanical system (MEMS) actuator. According to one embodiment of the invention, a sub-micron scale metallic combo-drive actuactor is used. According to other embodiments of the invention, means to apply the variable force may be in a variety of forms, including piezoelectric or magnetic.

According to different embodiments of the invention, the application of force modifies the crystal structure of the flexible PC and thereby changes the refractive index of the flexible PC for the purpose of steering at least one beam of light. The modeling, characterization, and fabrication of such a structure are discussed extensively below. According to different embodiments of the invention, the application of force modifies the periodicity of the flexible PC, thereby modifying the photonic bands in the flexible PC and changing the manner in which electromagnetic waves propagate in or on the flexible PC.

According to different embodiments of the invention, the application of force modifies the geometry of a line defect being used as a waveguide in the flexible PC, and thereby modifies the manner in which light propagates through the waveguide. According to different embodiments of the invention, the application of force modifies the size of a defect or series of defects which act as an optical cavity. This modification changes the resonance wavelength associated with the cavity. By using the cavity in conjunction with waveguides, a variety of functions can be accomplished. Different wavelengths can be added, dropped or filtered from waveguides. The lasing wavelength associated with a cavity can be modified. Wavelengths of light passing through the cavity can be modified as well.

The concept of strain tuning photonic crystals using actuators has been previously addressed in literature in a variety of forms. However, this invention differs in that photonic crystal itself is flexible, thus providing the superior tunability. Using an actuator or other means to apply force to a flexible photonic crystal to achieve wide tunability is novel. Embodiments of the invention realize a new means to dynamically control the photonic band structures, enabling the design and development of a new class of devices that exhibit previously unachievable or dramatically improved functionalities, and may also be large-scale integrated to produce advanced integrated photonic systems.

II. Modeling

To demonstrate the tunability achievable in flexible PC according to one embodiment of the invention, theoretical investigations were conducted on the effect of mechanical force on optical beam propagation. PCs are known to exhibit anomalous refraction behavior due to the highly nonlinear and anisotropic dispersion characteristics. This unique phenomenon was first discovered at microwave wavelengths, and soon after at optical wavelengths. Additionally, this phenomenon also exists in 2D PC slab waveguides with finite thicknesses, which represent the realistic structures compatible with conventional lithography-based fabrication technique. For a silicon 2D slab PC, a refraction angle up to 70° was estimated for incident angles less than 7°, and frequency components differing only by 3% were separated by 15°, much larger than what's achievable with conventional gratings. These effects have recently been demonstrated experimentally in a GaAs-based 2D slab PC structure.

For numerical modeling of this invention, the plane-wave method and finite-difference time-domain (FDTD) method were used to calculate photonic band structures, equi-frequency dispersion curves and refraction angles, and also to directly visualize the propagation of an optical beam. The test structure that was modeled was comprised of a triangular array of silicon pillars embedded in PDMS. The dielectric constants of silicon and PDMS were set to be 12 and 2.4, respectively. The pillar diameter was $0.6\alpha$, where $\alpha$ is the lattice constant, i.e. the center-to-center distance between two adjacent pillars. The structure was discretized into a numerical grid with 15-32 points per lattice constant. For the calculation of photonic band structures and equi-frequency dispersion surfaces, the computational domain contained only one unit cell with periodic boundary conditions. For beam propagation simulations by the FDTD method, a large structure enclosed by perfectly matched layer absorbing boundary condition was modeled.

Figure 2:
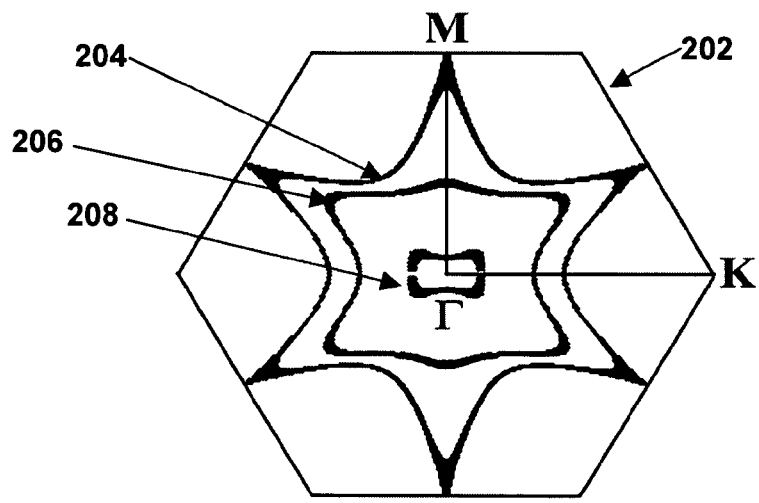
FIG. 2 conceptually illustrates various dispersion curves in the hexagon representation of the first Brillouin zone boundary according to one embodiment of the invention.
Figure 3:
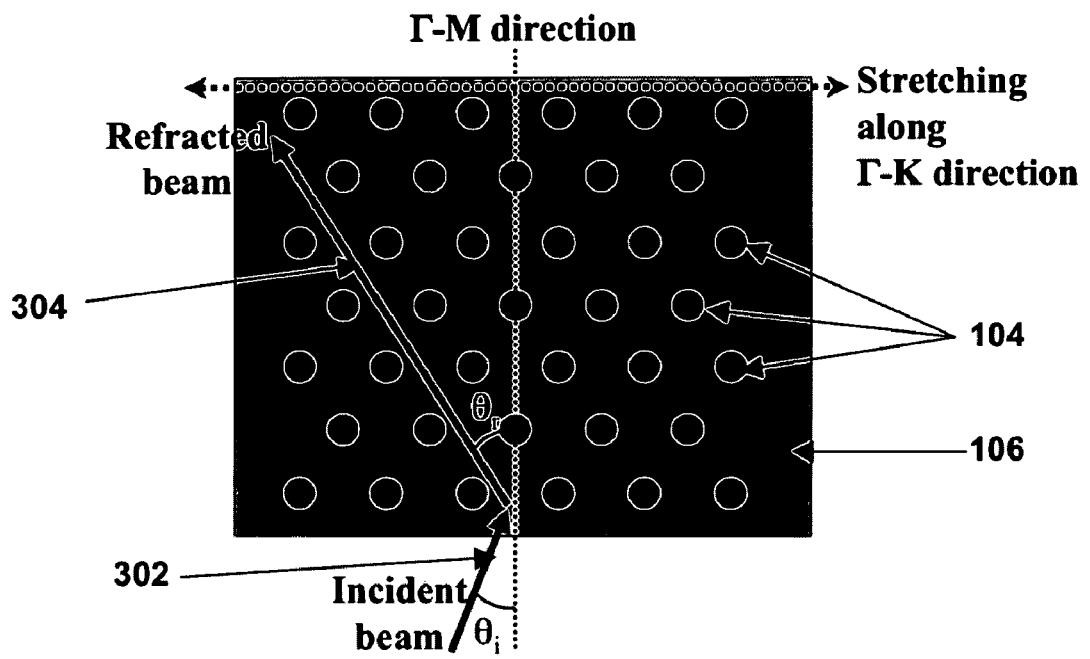
FIG. 3 shows a schematic diagram of a triangular PC structure of silicon pillars in a PDMS film according to one embodiment of the invention.

The test structure was found to exhibit anomalous refraction behavior at a normalized frequency ($\omega\alpha/2\pi c$) of 0.39. This is illustrated in FIG. 2, where the hexagon 202 represents the first Brillouin zone boundary. The equi-frequency dispersion curve for the unstressed triangular PC (outer curve) 204 shown in FIG. 2 has a star-like shape, exhibiting sharp inflection points along the high symmetry directions, $\Gamma$-M and $\Gamma$-K. These inflection points represent regions where strong variation in the light propagation direction is expected. The system was then modeled under mechanical stress, at 5% 206 and 10% 208 elongation. This lowers the crystal symmetry and consequently yields a strong modification of the dispersion surface. FIG. 3 illustrates stretching along the $\Gamma$-K direction, along with examples of an incident beam 302 and refracted beam 304. When the PC is uniformly stretched in the $\Gamma$-K direction, the dispersion curve becomes consequently distorted as shown in FIG. 2. It is evident that the dispersion curves are extremely sensitive to the mechanical deformation, especially along the horizontal direction ($\Gamma$-M direction) normal to the direction of mechanical force. As shown, the dispersion curves along the $\Gamma$-M direction become flattened significantly as the PC is stretched along the $\Gamma$-K direction. This results in a very large change in the refraction behavior for optical beams propagating near the $\Gamma$-M direction.

Figure 4:
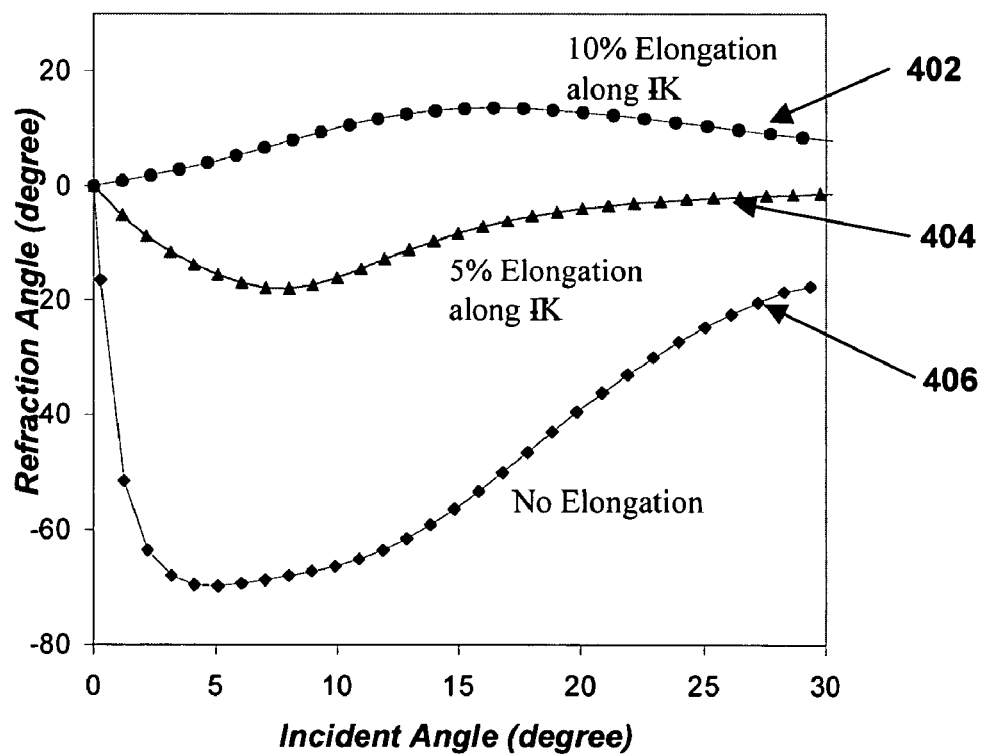
FIG. 4 shows a graph which illustrates refraction angles calculated from various dispersion curves according to one embodiment of the invention.

Since the group velocity is defined as the gradient of dispersion surface in k-space, the refraction angles can be estimated from the curvature of the equi-frequency dispersion curve. The calculated refraction angles are shown in FIG. 4, and angles are measured from the $\Gamma$-M direction. All three cases (no elongation 406, 5% elongation 404, and 10% elongation 402) exhibit unconventional refraction behaviors, deviating strongly from the Snell's law. The perfect triangular lattice exhibits giant negative refraction in which the refraction angle reaches ~70° for an incident angle as small as 5°. As the PC is mechanically stretched, however, due to the flattening of the dispersion curve, the refraction angle decreases dramatically and varies only little as the incident angle is changed. Furthermore, for the case of 10% stretching, it no longer exhibits negative refraction but the normal refraction behavior. The differences in refraction angles between the perfect triangular lattice and 10% stretched crystal reach more than 75° for a fairly wide range of incident angles between 5 and 15°.

Figure 5:
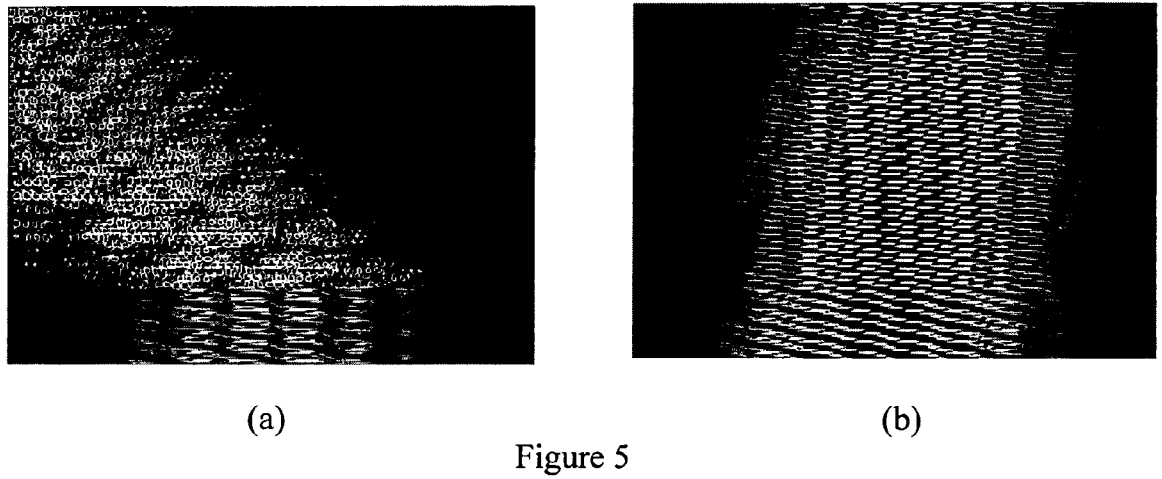
FIGS. 5($a$) and 5($b$) represent FDTD simulations showing the refraction of a gaussian beam according to one embodiment of the invention.

A beam propagation simulation using the FDTD method further confirmed this equi-frequency dispersion curve analysis. The real space simulati path from which the refraction angles can be measured directly. The FDTD simulations yielded the results that are consistent with the analysis based on the equi-frequency dispersion curves. FIGS. 5(a) and 5(b) show two simulations done for a perfect triangular lattice and 10% stretched crystal, with a gaussian beam incident with an angle of 12°. The incident gaussian beam was launched from the bottom of the computational domain and the flexible PC structure was placed in the upper region with the same orientation shown in FIG. 3. The large difference in refraction angles between the two cases is clearly illustrated.

The large change in refraction angle is achieved with a very small mechanical deformation. When designed for the communication wavelength of 1.54 μm, the pillar-to-pillar distance, $\alpha$, is 0.6 μm and a 10% change is a mere 60 nm per unit cell. A larger stretching could, of course, induce an even greater change in refraction behavior, but the fatigue and elasticity limit of the polymer must also be considered. With finite element modeling, it was confirmed that with up to 10% stretching, the polymer would be stretched uniformly with its displacement linearly proportional to the applied mechanical force.

Another important consideration that needs to be made is the Poisson ratio of the flexible polymer. PDMS has a very large value of Poisson ratio approaching nearly 0.5. This means that a 10% stretching along the Γ-K direction will result in a simultaneous reduction in film thickness by 5%, or 15 nm in the test structure. The photonic band structure in this embodiment was not very sensitive to the slab thickness, as it concerns primarily with the light propagation along the slab. Thus, such small changes in thickness will not significantly affect the light propagation characteristics in many embodiments, although this issue must be accounted for. It is also worth pointing out that the tunability of the anomalous refraction behavior is not limited to one particular direction and similar behaviors have also been observed for stretching along the Γ-M direction. This result demonstrates that mechanical tuning of the optical properties of this and other PCs is a broadly applicable concept. In sum, due to the sensitivity of photonic band structure to the physical changes in crystal structure, a very large tunability can be achieved.

III. Fabrication and Characterizations

Figure 6:
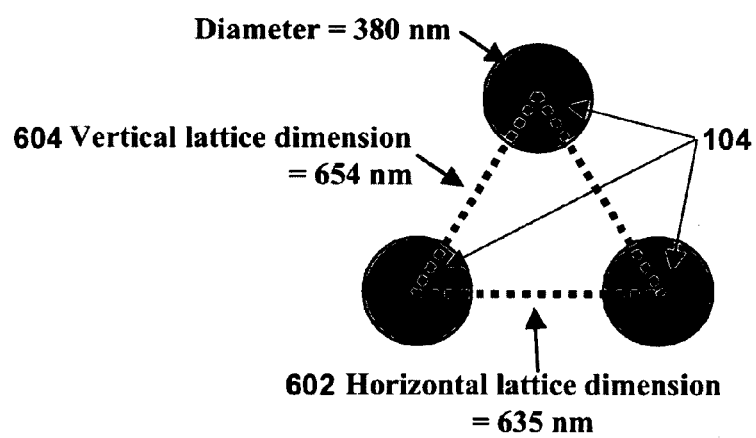
FIG. 6 illustrates dimensions of the unit cell according to one embodiment of the invention.
Figure 7:
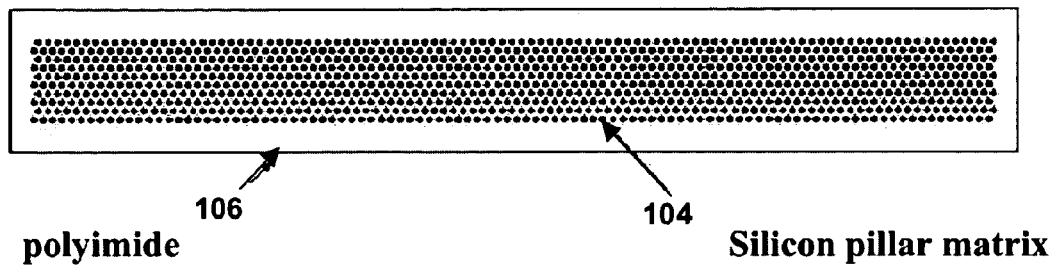
FIG. 7 conceptually illustrates an entire fabricated photonic crystal structure layout according to one embodiment of the invention.

Different embodiments of the invention were fabricated. The actual dimensions of the fabricated photonic crystal device are shown in FIG. 6. The diameter of each silicon pillar 104 was 380 nm. A triangular lattice array was formed, wherein the horizontal lattice dimension 602 was 635 nm and the vertical lattice dimension 604 was 654 nm. Slight deviations from the perfect triangular lattice occurred due to the accuracy of the e-beam tool. The layout of the entire photonic crystal device is shown in FIG. 7. The test structures have 10 rows with 100 silicon pillars 104 per each row, embedded in flexible polymer 106. Each row was approximately 571 nm apart. Thus, the photonic crystal structures have a total width of 5.14 μm and length of 62.87 μm as measured from the center of the silicon pillars.

In this case, polyimide is used as the flexible polymer component. The polyimide layer used to support the pillars was designed to be 4.0 μm larger than the width of the photonic crystal structures in order to provide plenty of tolerance for aligning the polyimide mask to the silicon pillars. Consequently, the top of the polyimide is situated approximately 2.0 μm above the top of the silicon pillar matrix and the bottom of the polyimide is situated approximately 2.0 μm below the bottom of the matrix.

Figure 8:
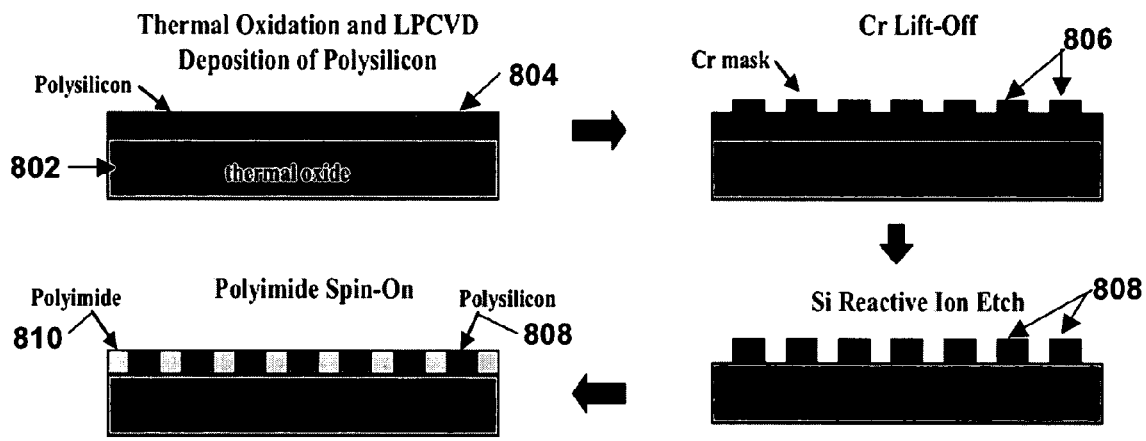
FIG. 8 conceptually illustrates the process flow for the fabrication of flexible PC structures according to one embodiment of the invention.

Cross sectional schematics of the process are shown in FIG. 8. The process can be broken into four major subcategories: initial thermal oxide growth and polysilicon deposition, the first level polysilicon mask level and etch, the deposition of the polyimide layer, and the second level polyimide mask level and etch. The original silicon wafers were (100) oriented 3 inch wafers highly doped with phosphorus to attain resistivities between 0.008 to 0.018 ohms-cm. These wafers were then oxidized using a wet oxidation process to a thickness of 3.0 μm. An undoped polysilicon layer 804 was then deposited on top of the oxide 802 to a thickness of 0.35 μm by LPCVD. The various process steps were then taken to form the photonic crystal polysilicon mask level and etch the resultant polysilicon mask. A bi-layer copolymer photoresist stack was used to form the photoresist mask for the silicon pillar matrix which was subsequently exposed and developed to form the desired photonic crystal pattern. Next, chromium was evaporated to a thickness of 10 nm and the chromium mask 806 is formed by a subsequent lift-off process. The silicon pillars 808 were then formed by using a silicon RIE etch using a $CF_4$/8.75% $O_2$ plasma. The chromium caps were then finally removed using a highly selective chromium etch.

Polyimide was then deposited in top of the silicon PC structure. First an adhesion promoter was applied to the surface followed by the deposition of polyimide by spin coating. The polyimide was then baked in a high temperature. The resulting polyimide 810 was approximately 400 nm thick. Various process steps were then taken to form the polyimide mask and etch the polyimide in order to generate the polyimide layer supporting the silicon pillars. The polyimide was first patterned by depositing, exposing and developing a positive optical photoresist. The chromium evaporation and lift-off processes were then used to form the metal mask. The polyimide layer supporting the photonic crystal device was then formed by using $O_2$ RIE etch. In sum, the device structure is compatible with the lithographic fabrication technique and is therefore fitting for monolithic integration with other semiconductor-based opto-electronic devices.

Figure 9A:
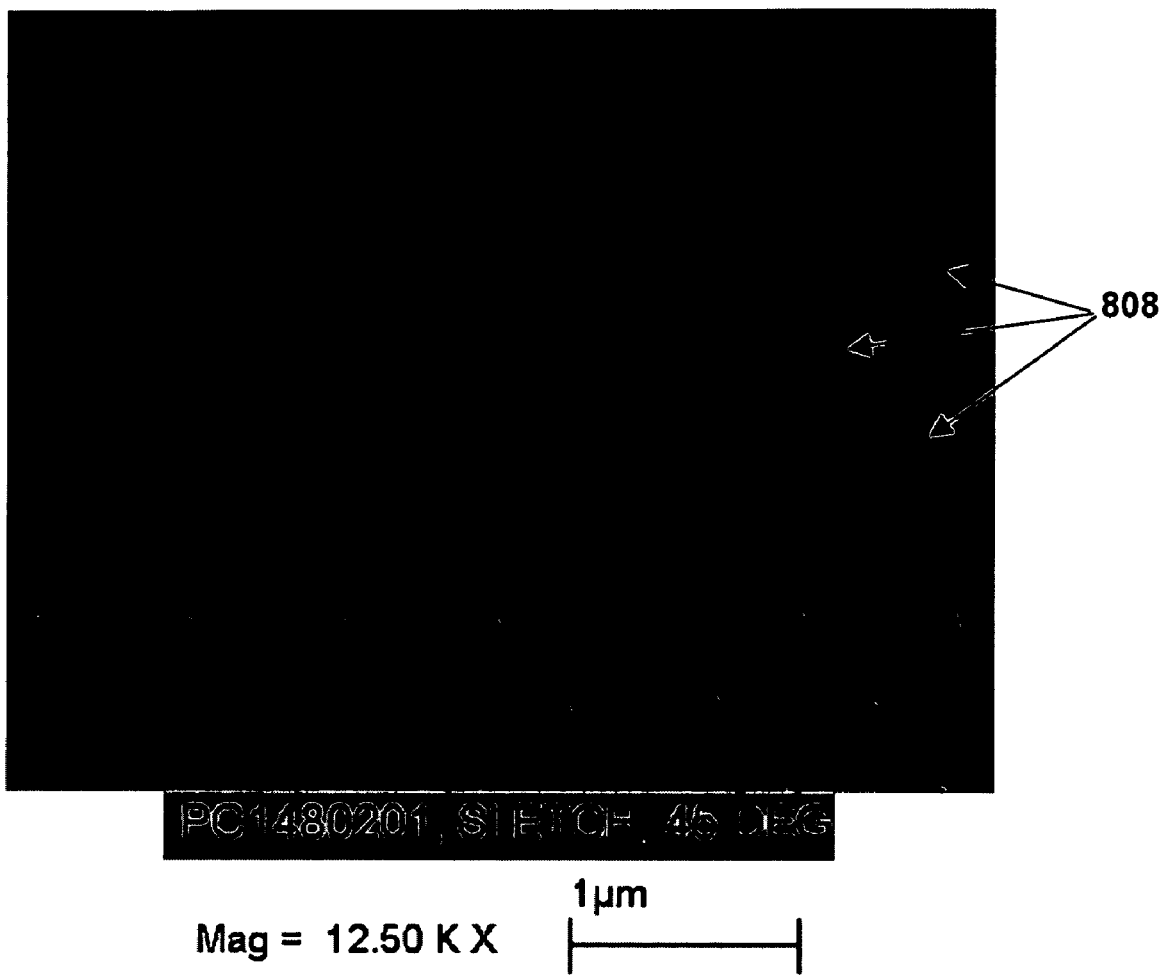
FIGS. 9(a), 9(b), and 9(c) show SEM photomicrographs of triangular arrays of circular silicon pillars according to one embodiment of the invention.
Figure 9B:
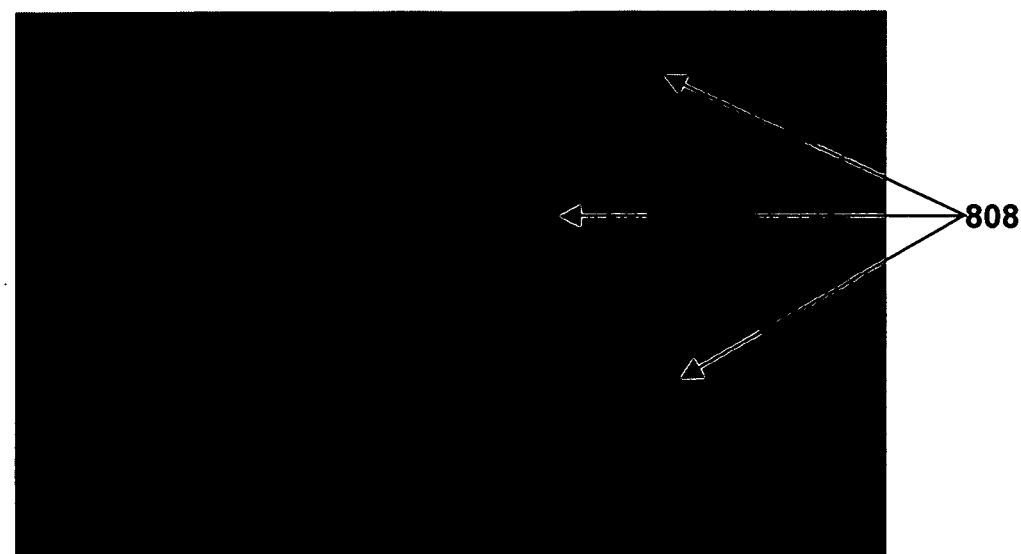
Figure 9C:

The ultimate microstructures generated at various stages of the process including the final structure are shown in FIGS. 9(a), (b) and (c) and 10(a) and (b). FIG. 9(a) shows an SEM photomicrograph of an anisotropically etched test silicon pillar 808 array. FIG. 9(b) shows a close-up image of the silicon pillar 808 array. FIG. 9(c) shows an SEM image of a silicon pillar 808 array embedded in the spin coated polyimide layer. In addition to the silicon pillar array, poly-silicon is also patterned to provide a waveguide to the FPC for easy beam coupling.

Figure 10A:
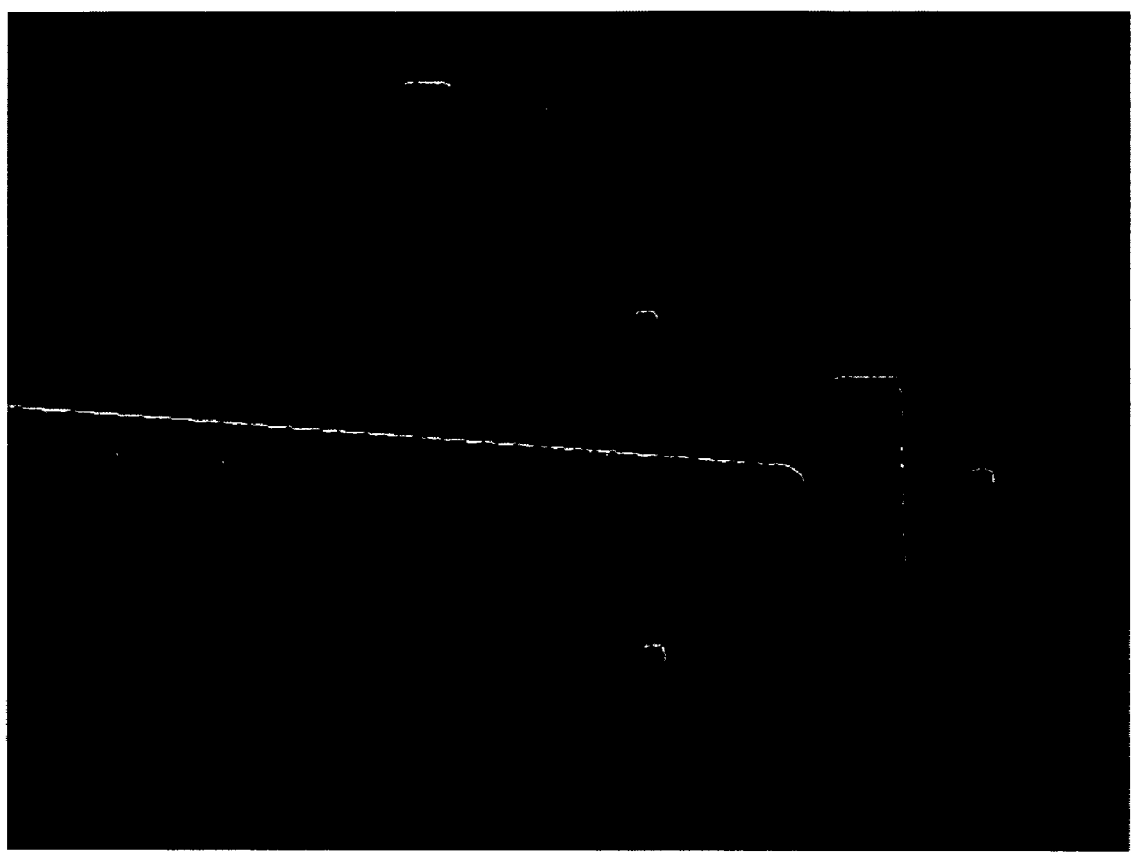
FIGS. 10(a) and 10(b) show SEM photomicrographs of an angled silicon waveguide and air suspended flexible PC.
Figure 10B:
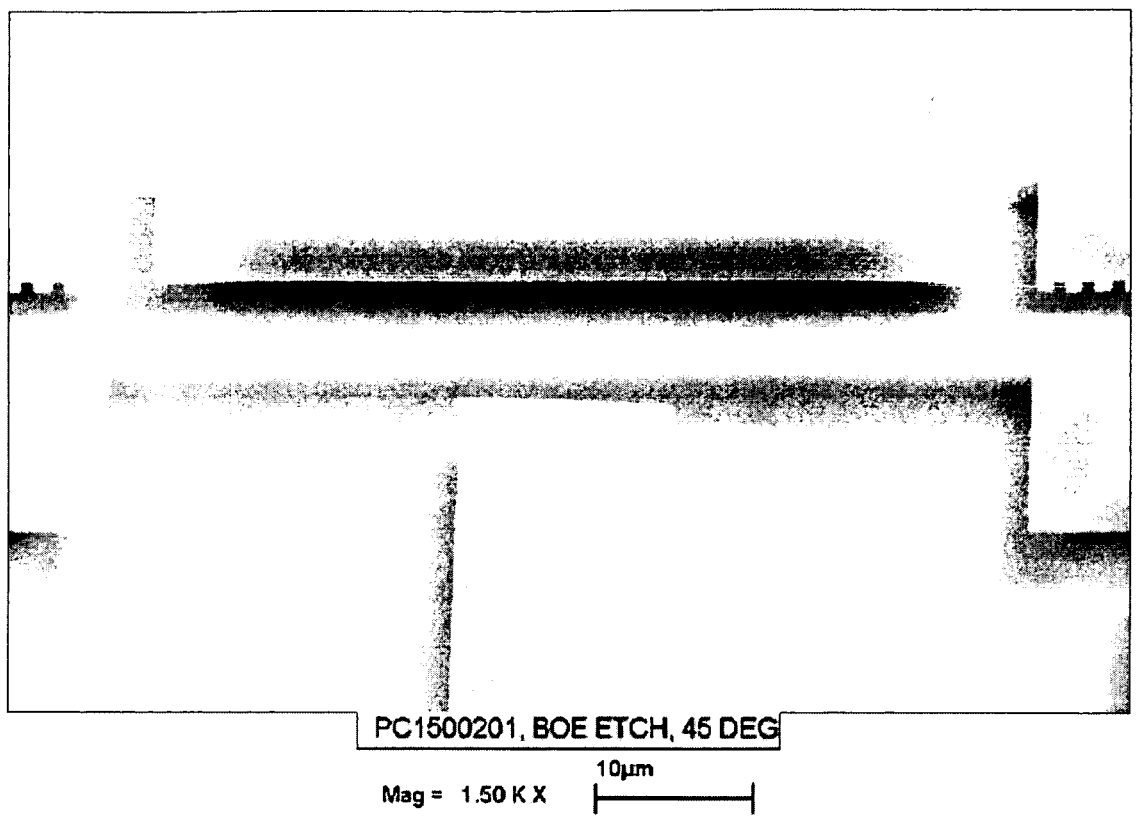

FIG. 10(a) shows an SEM photomicrograph of the angled silicon waveguide with a block of silicon pattern for beam coupling testing. In order to realize a MEMS actuated flexible PC, a suspended flexible PC (FIG. 10(b)) was fabricated. In the fabrication of the suspended FPC, an oxide layer underneath the patterned FPC was selectively etched away. Extensive fabrication characterization was carried out to find the optimum process sequence for the air suspended FPC.

The fabricated structures went through extensive optical characterizations. Fiber-coupled lasers emitting at 1550 and 1310 nm were used as sources and an InSb detector and a vidicon camera as detectors. For characterization purposes, the flexible PC structures were fabricated along with a silicon ridge waveguide through which a probe laser beam is delivered to the flexible PC structure. Several identical flexible PC structures were fabricated with input waveguides making different incident angles, so that the refractive properties could be investigated as a function of incident angles. An example of the input waveguide and flexible PC structure co-fabricated on a single wafer is shown in FIG. 10(a).

The laser beam from the source was first fed through a polarization controlling paddle (PCP) and then butt-coupled to the ridge waveguides etched onto the wafer. The PCP allows the device to be illuminated with either TE or TM polarized light, which behave very differently in the photonic crystal region. The device's refractive properties were directly measured by imaging both the light scattered out of the device, and light transmitted through the device. Due to structural imperfections and coupling losses, light leaks out of the plane of the wafer and is captured by a microscope on a translation stage, and then recorded by a vidicon camera.

Figure 11:
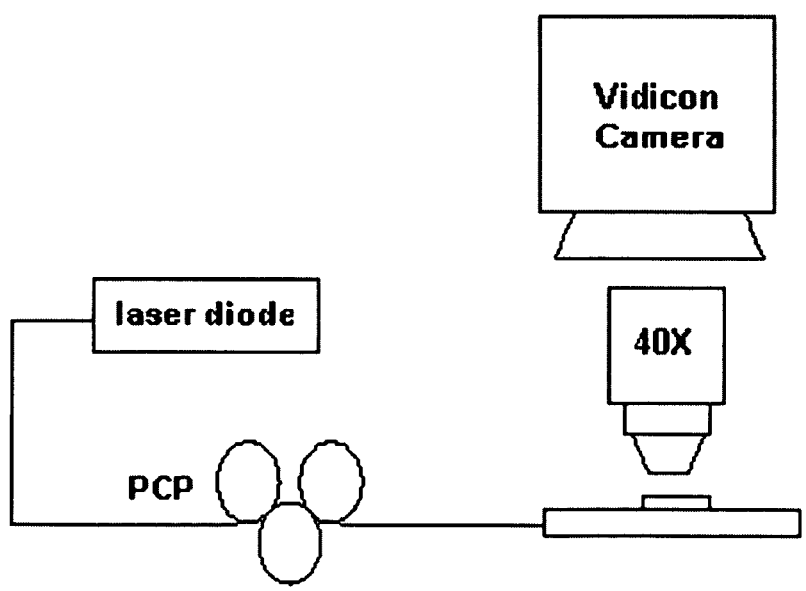
FIG. 11 conceptually illustrates the optical characterization setup.

When the losses inside the photonic crystal matrix are large enough, a ray path inside the structure can be resolved by imaging the scattering from above. Only a small amount of light will be lost, and refraction inside the photonic crystal is deduced by the location of the transmitted spot where it hits the deflection block placed on the exit side of the flexible PC structure. The measurement setup is schematically shown in FIG. 11.

Figure 12:
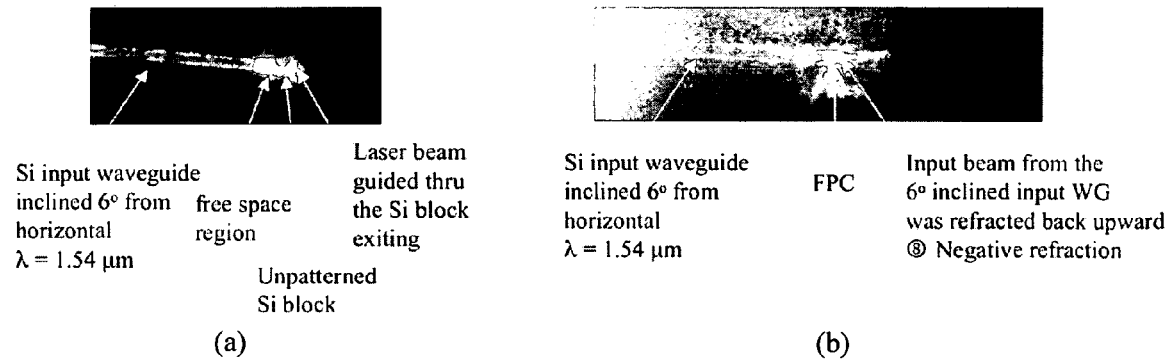
FIG. 12 illustrates vidicon camera images showing light refraction according to one embodiment of the invention.

FIGS. 12(a) and 12(b) show images from the vidicon camera. The small leakage through the side walls of the silicon input waveguide could be seen, showing the path of the input laser beam. As the input beam hits the flexible PC structure, a larger amount of light is scattered out of the plane, forming a bright spot. A reference sample (free space) and a flexible PC structure were both tested, with the input waveguides making an incident angle of 6° in both cases. In FIG. 12(a), a reference sample is shown in which a region of free space is fabricated in place of the flexible PC structure. The size and dimensions of the free space region are identical to the flexible PC structure and an unpatterned silicon block is placed to detect the beam leaving the free space region. This serves as the reference sample and clearly shows the path of the input beam through the free space region, and is partially coupled through the silicon block. The bright spot on the right side is the guided beam exiting the silicon block. The dark image between the two bright spots on the input and exit sides of the silicon block clearly demonstrates that the probe laser beam is coupled in and guided through the silicon block. The same measurements were then made with the flexible PC structure. The geometry is identical to the reference sample shown in FIG. 12(a), except that there was a real flexible PC structure in place of the free space region. As shown in FIG. 12(b), the beam path through the input waveguide was once again observed. The difference in this case, however, was that the flexible PC structure caused the beam to be refracted back upwards, clearly showing negative refraction. This illustrates negative refraction in a flexible, silicon-based PC structure.

Figure 13:
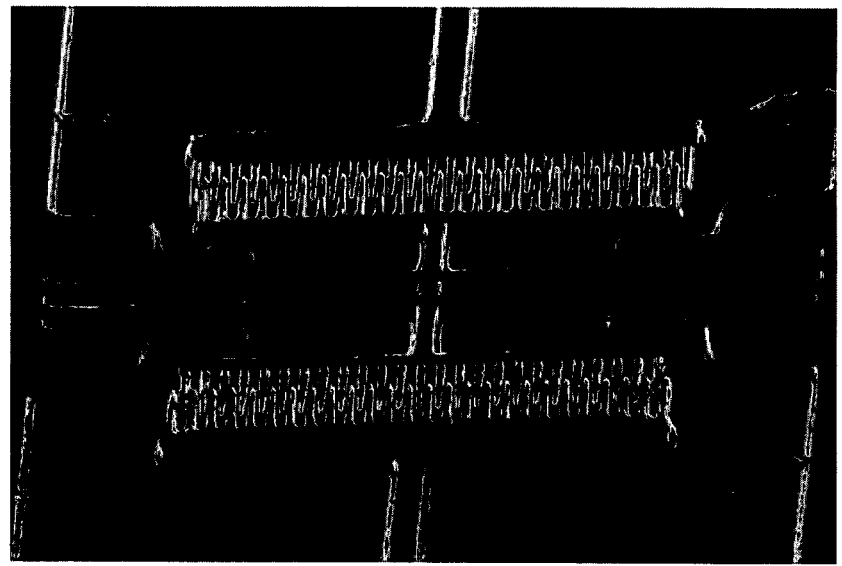
FIG. 13 shows an SEM photomicrograph of a sub-μm metallic comb drive according to one embodiment of the invention.

According to one embodiment of the invention, a submicron scale metallic comb-drive actuator is used. Such an actuator is illustrated in FIG. 13.

The invention claimed is:

1. A device comprising:
   a photonic crystal having a periodic array of dielectric material embedded in a flexible polymer, said photonic crystal exhibiting negtive refraction; and
   means for applying a variable amount of force to said photonic crystal to induce physical changes in the crystal structure of said photonic crystal.

2. The device of claim 1, wherein said dielectric material is a semiconducting material.

3. The device of claim 2, wherein said semiconducting material is silicon.

4. The device of claim 1, wherein said array of dielectric material comprises a plurality of pillars of dielectric material.

5. The device of claim 1, wherein said dielectric material has a refractive index greater than 3, and said flexible polymer has a refractive index in the range of 1.4 to 1.6.

6. The device of claim 1, wherein the ratio of the refractive index of said dielectric material to the refractive index of said flexible polymer is greater than 2.

7. The device of claim 1, wherein said flexible polymer comprises poly-dimethylsiloxane (PDMS) or polyimide.

8. The device of claim 1, wherein said means comprises at least one micro-electromechanical-system (MEMS) actuator.

9. The device of claim 1, wherein said force causes stretching of the photonic crystal in the range of 5 to 10%.

10. The device of claim 1, wherein said photonic crystal is a two-dimensional photonic crystal.

11. The device as in claim 1, 2, 4 or 8, wherein said force modifies the photonic band structure of said photonic crystal and thereby modifies the manner in which electromagnetic waves propagate in or on said photonic crystal.

12. The device as in claim 1, 2, 4 or 8, wherein said force modifies the refractive index of the photonic crystal for the purpose of steering at least one beam of light.

13. The device as in claim 1, 2, 4 or 8, wherein:
   a part of said photonic crystal acts as waveguide for at least one a beam of light;
   said photonic crystal further comprising at least one defect mode which is used as a cavity mode;
   light is reflected in said cavity mode such that laser light is produced at a wavelength that is related to the structure of said cavity mode; and
   said force modifies the lasing wavelength.

14. The device as in claim 1 or 2, wherein:
   a part of said photonic crystal acts as first waveguide for at least one beam of light;
   a part of said photonic crystal acts as second waveguide for at least one beam of light;
   said photonic crystal further comprises at least one defect mode to connect said first waveguide and said second waveguide; and
   said force modifies said photonic crystal to move at least one selected wavelength of flight from said first waveguide to said second waveguide.

15. The device as in claim 1, wherein:
   a part of said photonic crystal acts as waveguide for at least one beam of light;
   said photonic crystal further comprises at least one defect mode connected to said waveguide; and
   said force modifies said photonic crystal to filter at least one selected wavelength of light from said waveguide.

16. The device as in claim 1, wherein:
   a part of said photonic crystal acts as waveguide for at least one beam of light;
   and said force modifies the time for a beam of light to propagate through the waveguide.

17. A device comprising:
   a photonic crystal having a periodic array of dielectric material embedded in a flexible polymer; and
   at least one micro-electro-mechanical-system (MEMS) actuator for applying a variable amount of force to said photonic crystal to induce physical changes in the crystal structure of said photonic crystal, wherein said MEMS actuator is:
   coupled with a first side and a second side of said photonic crystal; and
   configured to provide substantially uniform stretching of said photonic crystal.

18. A device comprising:
   a photonic crystal having an array of silicon pillars embedded in a flexible polymer, said photonic crystal exhibitin negative refraction; and
   at least one micro-electro-mechanical-system (MEMS) actuator coupled to said photonic crystal, said actuator configured to apply variable force to said photonic crystal to induce physical changes in the crystal structure of said photonic crystal, and to provide substantially uniform stretching of said photonic crystal.

19. A method of steering a beam of light, said method comprising the steps of:

(a) providing at least one beam of light;
(b) passing at least one of said beams through a photonic crystal having an array of dielectric material embedded in a flexible polymer; and
(c) applying variable force to said photonic crystal to modify the refractive index of said photonic crystal and thereby rotate the direction of at least one of said beams.

20. A method of producing a laser output of a desired wavelength, said method comprising the steps of:
   (a) providing at least one beam of light;
   (b) passing at least one of said beams through a photonic crystal having an array of dielectric material embedded in a flexible polymer, said at least one of said beams passing through a portion of said photonic crystal exhibiting negative refraction, wherein
      (i) a part of said photonic crystal acts as waveguide for the at least one of said beams;
      (ii) said photonic crystal further comprising at least one defect mode which is used as a cavity mode, and is connected to said waveguide; and
      (iii) light is reflected in said cavity mode such that laser light is produced at a wavelength that is related to the structure of said cavity mode; and
   (c) applying variable force to said photonic crystal to modify the lasing wavelength.

21. A method of moving a wavelength of light from a first waveguide to a second waveguide, said method comprising the steps of:
   (a) providing at least one beam of light;
   (b) passing at least one of said beams through a photonic crystal having an array of dielectric material embedded in a flexible polymer, said at least one of said beams passing through a portion of said photonic crystal exhibiting negative refraction, wherein
      (i) a part of said photonic crystal acts as a first waveguide for said at least one of said beams;
      (ii) a part of said photonic crystal acts as a second waveguide for at least one beam; and
      (iii) said photonic crystal further comprising at least one defect mode, to connect said first waveguide and said second waveguide; and
   (c) applying variable force to said photonic crystal to select at least one wavelength of light to be moved from said first waveguide to said second waveguide.

22. A method of filtering a wavelength of light from a waveguide, said method comprising the steps of:
   (a) providing at least one beam of light;
   (b) passing at least one of said beams through a photonic crystal having an array of dielectric material embedded in a flexible polymer, said at least one of said beams passing through a portion of said photonic crystal exhibitin negative refraction, wherein
      (i) a part of said photonic crystal acts as waveguide for said at least one of said beams; and
      (ii) said photonic crystal further comprising at least one defect mode, connected to said first waveguide; and
   (c) applying variable force to said photonic crystal to select at least one wavelength of light to be filtered from said waveguide.

23. A method of forming a device, said method comprising the steps of:
   (a) providing a photonic crystal having a periodic array of dielectric material embedded in a flexible polymer, said photonic crystal exhibiting negative refraction; and
   (b) coupling to said photonic crystal a means for applying a variable amount of force to said photonic crystal to induce physical changes in the crystal structure of said photonic crystal.

24. The method of forming a device, said method comprising the steps of:
   (a) providing a photonic crystal having a periodic array of silicon pillars embedded in a flexible polymer, said photonic crystal exhibiting negative refraction; and
   (b) coupling at least one micro-electro-mechanical-system (MEMS) actuator to said photonic crystal, said actuator to apply variable force to said photonic crystal to induce physical changes in the crystal structure of said photonic crystal.

* * * * *

UNITED STATES PATENT AND TRADEMARK OFFICE
CERTIFICATE OF CORRECTION

PATENT NO. : 7,283,716 B2
APPLICATION NO. : 10/969148
DATED : October 16, 2007
INVENTOR(S) : Wounjhang Park et al.

It is certified that error appears in the above-identified patent and that said Letters Patent is hereby corrected as shown below:

At Column 8, line 50, delete "simulati" and add --simulation by FDTD shows the actual beam -- before "path".
At Column 11, line 46, "negtive" should be -- negative --.
At Column 12, line 59, "exhibitin" should be -- exhibiting --.
At Column 13, line 39, add -- of light -- after "beam".
At Column 14, line 12, "exhibitin" should be -- exhibiting --.

Signed and Sealed this

Eighteenth Day of December, 2007

JON W. DUDAS
*Director of the United States Patent and Trademark Office*